United States Patent
Hughes et al.

(10) Patent No.: US 6,831,982 B1
(45) Date of Patent: Dec. 14, 2004

(54) ENCRYPTION KEY MANAGEMENT SYSTEM USING MULTIPLE SMART CARDS

(75) Inventors: James Prescott Hughes, Lino Lakes, MN (US); Steven Harvey McCown, Brighton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/443,963

(22) Filed: Nov. 19, 1999

(51) Int. Cl.⁷ .................................................. H04L 9/00
(52) U.S. Cl. ...................... 380/281; 713/169; 713/180; 380/44; 380/270
(58) Field of Search ................................ 713/180, 169; 380/44, 270

(56) References Cited

U.S. PATENT DOCUMENTS

| | | | |
|---|---|---|---|
| 4,757,534 A | | 7/1988 | Matyas et al. |
| 5,311,595 A | * | 5/1994 | Bjerrum et al. ............ 713/169 |
| 5,491,749 A | | 2/1996 | Rogaway |
| 5,604,801 A | * | 2/1997 | Dolan et al. ................ 713/159 |
| 5,689,561 A | | 11/1997 | Pace |
| 5,721,777 A | | 2/1998 | Blaze |
| 6,094,487 A | * | 7/2000 | Butler et al. ................ 380/270 |

FOREIGN PATENT DOCUMENTS

| | | |
|---|---|---|
| EP | 0 138 320 | 4/1985 |
| FR | 2 751 767 | 1/1998 |
| WO | 98 39745 | 9/1998 |

OTHER PUBLICATIONS

Krawczyk, H. et al., HMAC: Keyed–Hashing For Message Authentication; Feb. 1997 pp. 1–7.

Branstad, Dennis; Secure Hash Standard (SHS); Jan. 1992; pp. 1–10.

RSA Laboratories Frequently Asked Questions About Today's Cryptography; 1998, pp. 1–60.

* cited by examiner

*Primary Examiner*—Gilberto Barron
*Assistant Examiner*—Joseph M McArdle
(74) *Attorney, Agent, or Firm*—Yee & Associates P.C.

(57) ABSTRACT

Initially, a key range variable is created by concatenating the card group value, card number and reference number for an encryption key to be generated. A hashing algorithm generates an encryption key from a master key and the variable key range variable. The encryption key and the key range variable are output to the caller who requested the key. The encryption key is used to encrypt the information, while the variable key range is stored with the encrypted data. Generation of a decryption key requires a user call for a decryption key and includes the key range variable from the encrypted data. A hashing algorithm generates a decryption key from the master key and the key range variable. The decryption key is used to decrypt the information.

29 Claims, 7 Drawing Sheets

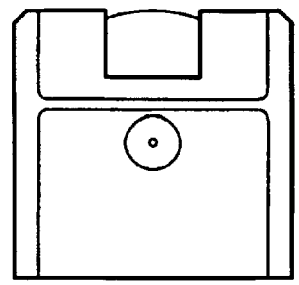
FIG. 1A
*PRIOR ART*
FIG. 1B
*PRIOR ART*
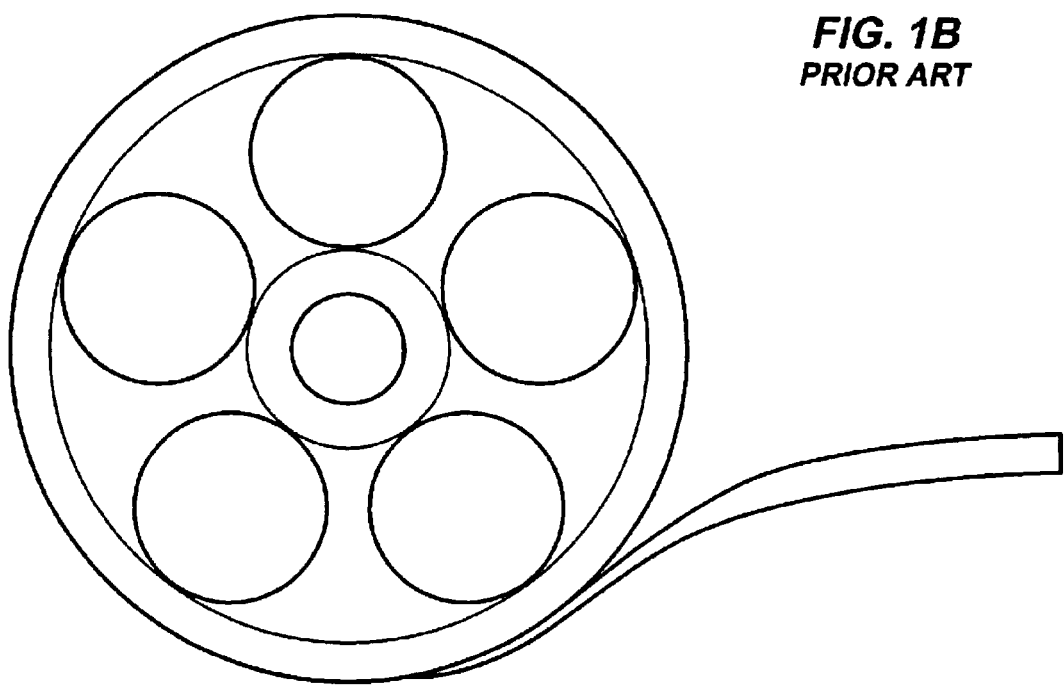
FIG. 1C
*PRIOR ART*

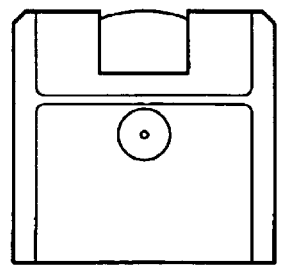
FIG. 2B
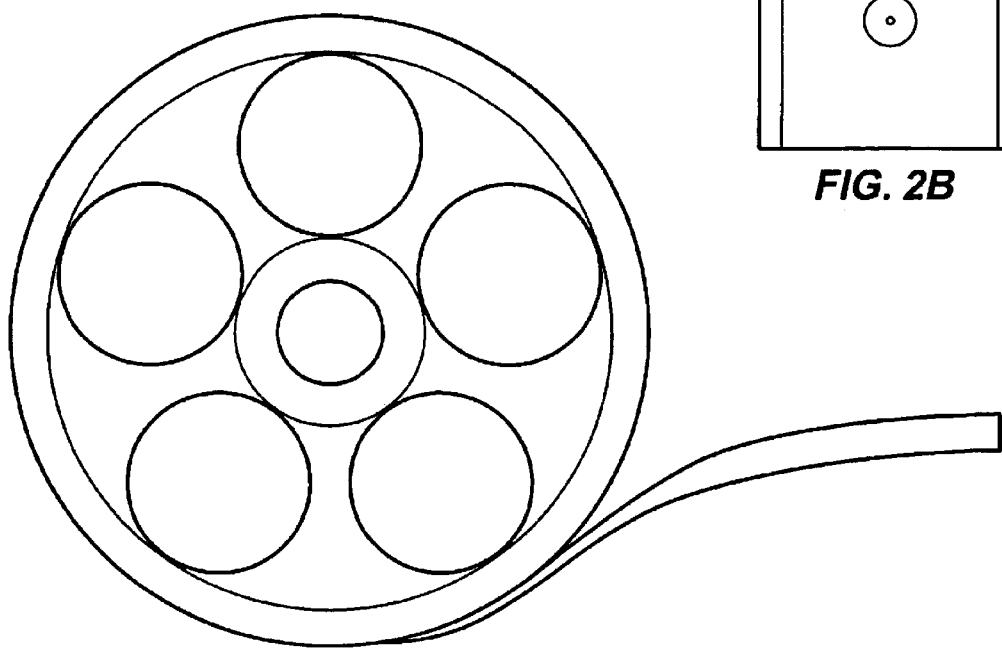
FIG. 2A
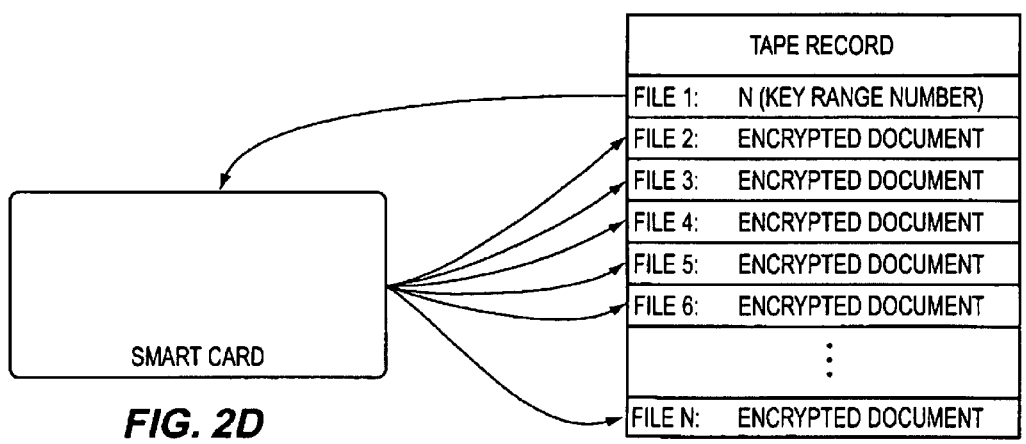
FIG. 2D
FIG. 2C

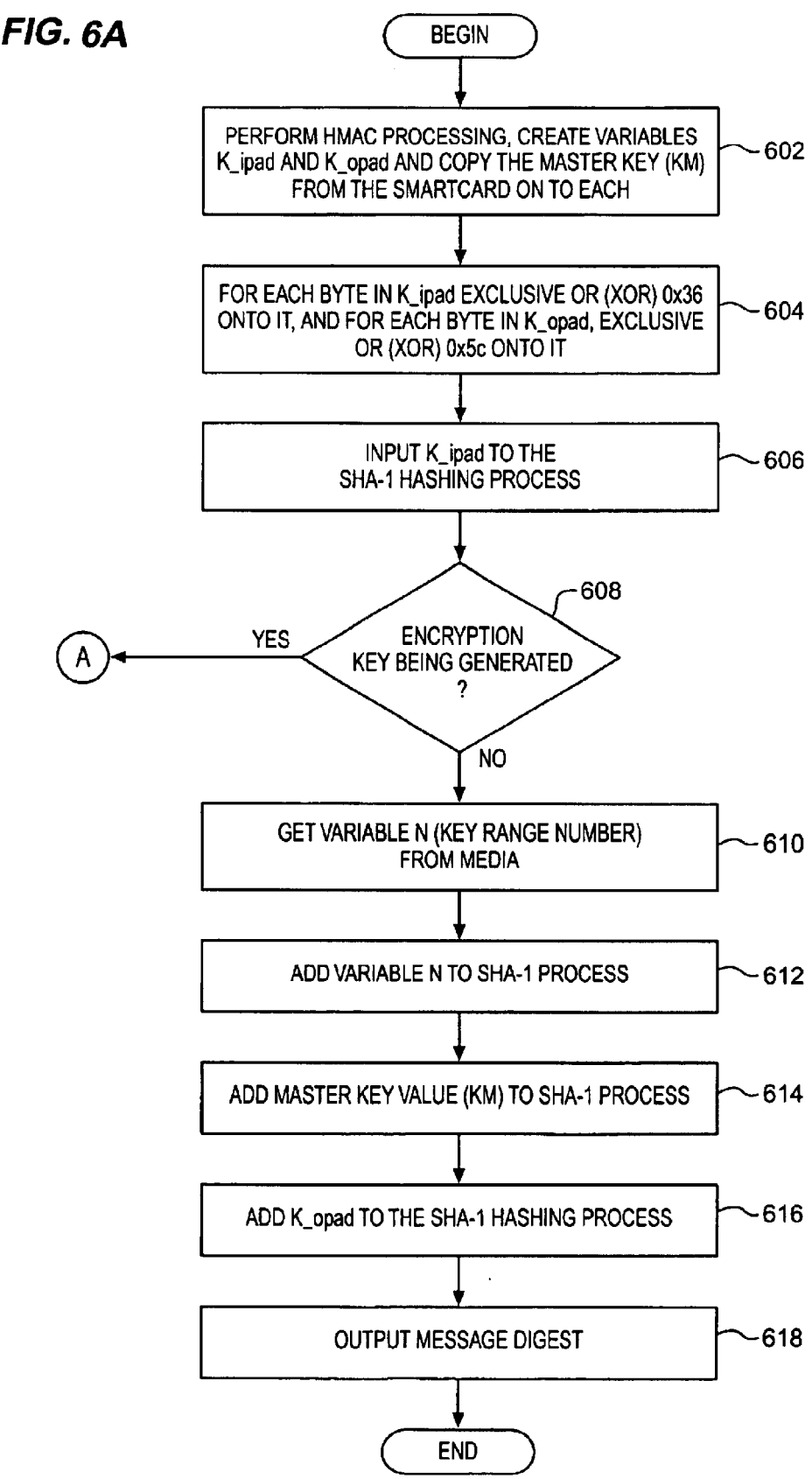

ENCRYPTION KEY MANAGEMENT SYSTEM USING MULTIPLE SMART CARDS

TECHNICAL FIELD

The present invention relates to the field of encryption technology. More particularly, the present invention relates to encryption key management.

DESCRIPTION OF RELATED ART

To most people, cryptography is concerned with keeping communications private. It is the use of codes to convert data so that only a specific recipient will be able to read it using a decryption device referred to as a decryption key. Encryption is the transformation of data, through the use of codes, into a form that is as close to impossible as possible to read without the appropriate knowledge (a key). Its purpose is to ensure privacy by keeping information hidden from anyone for whom it is not intended, even those who have access to the encrypted data. Decryption is the reverse of encryption; it is the transformation of encrypted data back into an intelligible form. The persistent problem of cryptography is that the decryption key must be transmitted to the intended recipient for decryption and may be intercepted.

Encryption and decryption generally require the use of some secret information, the decryption key. For some encryption mechanisms, the same key is used for both encryption and decryption; for other mechanisms, the keys used for encryption and decryption are different. In traditional cryptography, the sender and receiver of a message know and use the same secret key: the sender uses the secret key to encrypt the message, and the receiver uses the same secret key to decrypt the message. This method is known as secret key or symmetric cryptography. The main challenge is getting the sender and receiver to agree on the secret key without anyone else finding out. If they are in separate physical locations, they must trust a courier, a phone system, or some other transmission medium to prevent the disclosure of the secret key. Anyone who overhears or intercepts the key in transit can later read, modify, and forge all messages encrypted or authenticated using that key. The generation, transmission, and storage of keys is called key management; all cryptosystems must deal with key management issues. Because all keys in a secret-key cryptosystem must remain secret, secret-key cryptography often has difficulty providing secure key management, especially in open systems with a large number of users.

For an increasing number of reasons (financial, military, privacy, etc.), it is becoming highly desirable to store information in an encrypted form. However, even with all of the risks associated with failing to use encryption, most applications continue to store their information in an unencrypted fashion, partially due to the problems associated with keeping the secret key a secret.

As encrypted tapes are created, an encryption key is used to secure the information. When encrypted tapes are restored, a rapid method of identifying the decryption key is required. One popular method of key and data association is to encrypt the key and store it within the tape itself. While the key is more secure than if it were not encrypted, the major risk with this approach is that if the key (usually 128–256 bits) were decoded, then the rest of the tape would be vulnerable. In an effort to solve the above-mentioned problems, the present invention is disclosed.

SUMMARY OF THE INVENTION

The present invention relates to encryption key management through the use of smart card technology for generation encryption and decryption keys used with encryption/decryption algorithms. Two smart cards are employed to generate, store, and lookup encryption keys and decryption keys. Initially, an encryption smart card is initialized with a card group value and a card number. For each card number a reference number corresponding to the largest of the keys that it has generated is also stored on the smart card, initially the reference number is set to 0 and thereafter is incremented as each key is provided. Additionally, a master key value is written to the encryption card. A user must possess both the physical smart card and the personal identification number associated with the card in order to call for the generation an encryption key. Upon receipt of a key generation request, the Smart card creates a variable key range variable by concatenating the card group value, card number and reference number for the encryption key that is to be generated. A hashing algorithm generates a digest message from the master key and the variable key range variable. The digest is used for an encryption key. The encryption key and a variable key range variable are output to the caller who requested the key. Encryption keys generated with the encryption smart card may be used with any encryption algorithm that uses an encryption key. The variable key range variable, in and of itself, contains nothing that will compromise the key. Therefore, it may be freely stored with the encrypted data.

Generation of a decryption key requires that the user possess a decryption smart card and PIN. A user calls for a decryption key and includes the variable key range variable from the encrypted data. A hashing algorithm generates a digest message from the master key and the variable key range variable. The digest is used for a decryption key. The decryption key is output to the caller who requested the key and is used to decrypt the information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 1A–1C are diagrams representative of the prior art approach to decryption key management;

FIGS. 2A–2D are diagrams representative of an approach to decryption key management in accordance with a preferred embodiment of the present invention;

FIGS. 6A and 6B are flow charts depicting the key generation process in accordance with a preferred embodiment of the present invention.

DETAILED DESCRIPTION OF THE PREFERRED EMBODIMENT

Figure 3A:
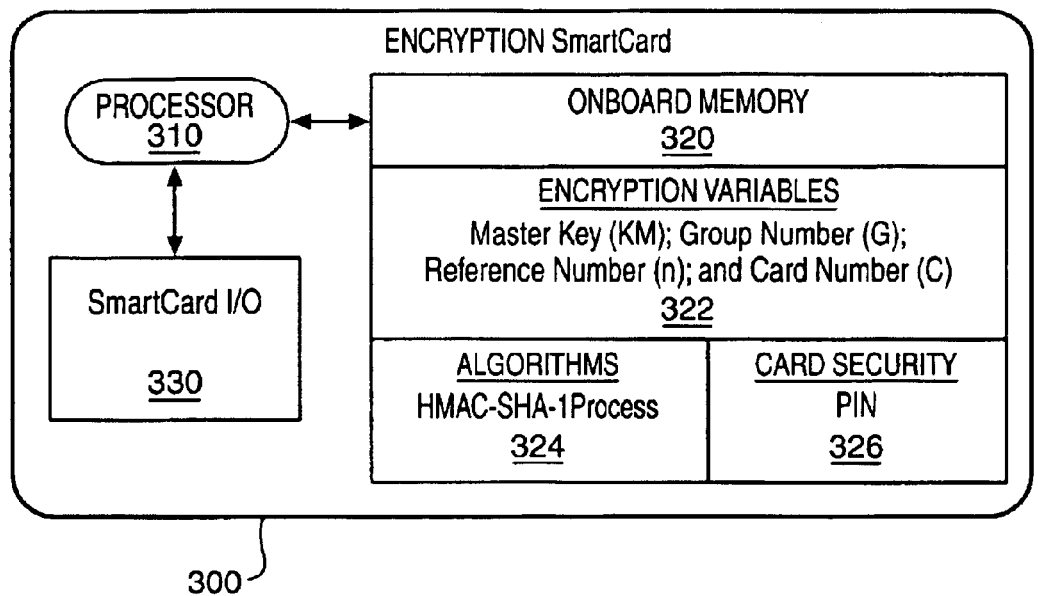
FIGS. 3A and 3B are schematics that represent smart cards configurations in accordance with a preferred embodiment of the present invention.

FIGS. 1A–1C are diagrams representative of the prior art approach to decryption key management. FIGS. 1A and 1B depict encrypted information, such as sensitive documents or secret information, stored in a binary, encrypted form on magnetic media, i.e. a reel and diskette respectively. For the purposes of the present invention, the media could well be optical storage means, or even transmission media such as electromagnetic or optical propagation transmission means. Proximate to the encrypted data is a decryption key, which is normally stored or transmitted in an encrypted form.

A serious concern is that there may be a chance that an attacker can decipher the secret key during transmission or more probably, when the encrypted data is stored. In the case of a magnetic tape media, a tape record is shown on FIG. 1C. Note that the decryption key is stored on the media itself, but held in an encrypted form. Subsequent to decoding, the decryption key is used to decipher any of the data files on the tape medium. Attackers may also attempt to clandestinely decipher the key and decode the remainder of the tape.

In the case of intercepting transmitted encrypted data, the encryption key may be transmitted sequentially with the encrypted data, albeit in its own encrypted form. Various schemes are employed for confusing attackers such as transmitting a number of encrypted keys with the encrypted data, each decryption key being decrypted by using a different decryption format. Thus, deciphering one key would not aid in deciphering other keys. The intended recipient knows in advance which is the proper decryption key and which are the decoy keys. However, an attacker can always store the encrypted data, along with the all of the transmitted keys, and then simultaneously hack each of the decryption keys. Of course, this method of attack is severely limited by the attacker's hacking resources.

FIGS. 2A–2C are diagrams representing an approach to decryption key management in accordance with a preferred embodiment of the present invention. FIGS. 2A and 2B depict encrypted data similar to those shown in FIGS. 1A and 1B. However, rather than storing or transmitting a decryption key with the encrypted data, only a key range variable (N) accompanies the encrypted data.

FIG. 2C depicts a tape or transmission record in accordance with a preferred embodiment of the present invention. Note that the decryption key is not stored on the media, but instead generated by a smart card, such as that shown in FIG. 2D, using the variable N. Importantly, each smart card contains a write-only master key (KM), which must correspond to a master key used to decrypt the data. The encrypted data cannot be decrypted from the information contained in the encrypted data and the variable N. Even the possession of the decryption smart card itself does not guarantee that the particular decryption key needed for deciphering the encrypted data will be generated. The attacker must also have access to the smart card's personal identification number (PIN) in order to generate the decryption key. Therefore, a successful attacker must possess the encrypted data, the variable N, the decryption smart card which corresponds to the encryption smart card, and the decryption smart card's personal identification number (PIN) in order to generate the decryption key needed for deciphering encrypted data.

Figure 3B:
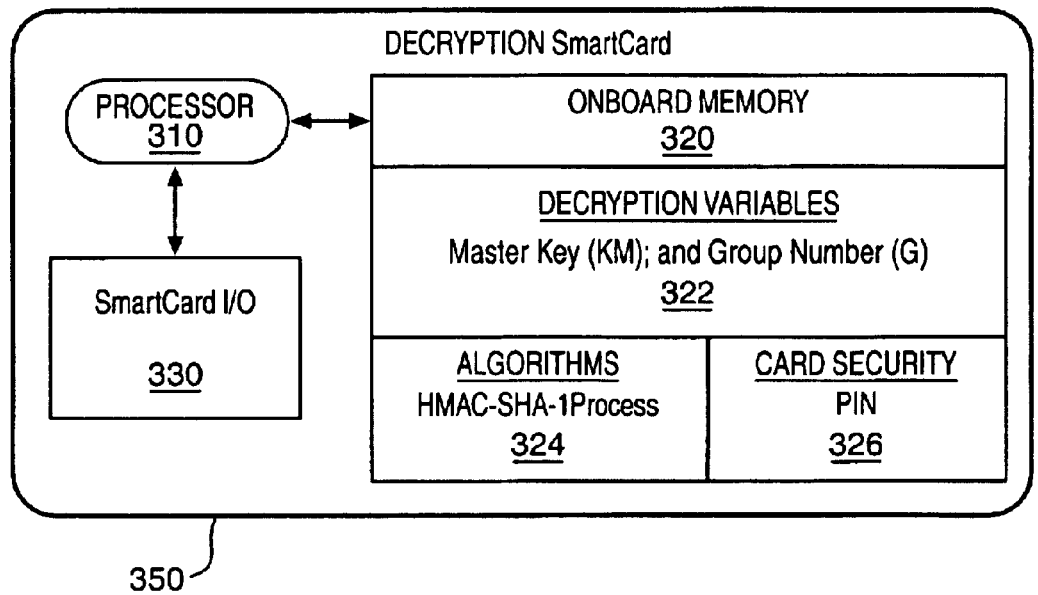

In accordance with a preferred embodiment of the present invention, the encryption key generation process is embodied in a Java Cardlet (an application that runs in the processing environment within a smart card). By using a smart card, the memory, algorithm, and persistent variables are inaccessible to potential attackers. FIGS. 3A and 3B are schematics representing smart cards in accordance with a preferred embodiment of the present invention. FIG. 3A depicts the structure of encryption smart card 300. Smart card 300 utilizes conventional smart card technology, in that it comprises onboard processor 310, I/O 330, and onboard memory (or cache) 320.

Processor 310 communicates to a remote caller via smart card I/O 330 for verifying PINs and receiving requests for generating a key. In accordance with a preferred embodiment of the present invention, the encryption key and decryption key are identical, however, depending on the type of encryption, the data might be encrypted with a first key and then decrypted with a second key, which is similar to public and privates key technology. In response to a request from a remote caller, processor 310 may retrieve information necessary for generating a decryption key from onboard memory 320. This information may include the current PIN, needed for verifying a PIN request, along with the applications and applets needed for processing the PIN verification request. Additionally, encryption smart card 300 maintains four encryption variables 322:

1. A 256-bit Master Key (KM) that is set when the smart card is first initialized
2. A 3-byte key card number (C) that is set when the smart card is first initialized
3. A 5-byte reference number (n; initially set to 0) corresponding to each of the keys that it has generated (i.e., via a call to GetNextKey( ))
4. A 32-bit CardGroup number (G) which describes a set of cards using the same Master Key The length of the values presented herein are representative of a preferred embodiment of the present invention but in practice may consist of any bit length. The master key is generated by an off-board application for the sole purpose of creating these cards and then destroyed. A one-time key is used for generating KM and destroyed. The KM is written to encryption smart card 300 when the smart card is initiated. KM must remain a secret because the key generation processes relies on three primary components: the range number (N), which may be found, unencrypted, in the encrypted information; the public domain hashing algorithms; and KM. Of the three, KM is the only secret component.

With respect to encryption variables 322, group number (G) is issued cards with the same KM. G can be any length, but a 4-byte value has been implemented. Card number (C) is a unique designation, which is given to each card within a given group. C can be any length, but it is currently implemented as a 3-byte value. Each encryption smart card 300 implements a key range variable (N), which is a concatenation of the card group (G), the individual card number (C), and the reference number (n) (of the form 0xGGGGCCCnnnnn). For example, key card #1 would have the range 0x123400100000–0x0012341FFFFF and key card #2 would have the range 0x123400200000–0x1234002FFFFF.

Once initialized, C, G, and KM cannot be changed. After the encryption key card generates each key (described in detail below), n is incremented by one. When n reaches the boundary of the data type (e.g., 0xFFFFF), encryption smart card 300 can no longer be used for key generation. Up to 4096 key generation cards may be created for a given KM and each card generates a unique set of keys.

Additionally, onboard memory 320 may contain algorithms 324 needed for generating a new key. These algorithms include HMAC (Hashing based Message Authentication Codes), which is a mechanism for message authentication using cryptographic hash functions. HMAC can be used with any iterative cryptographic hash function, e.g., SHA-1, in combination with a secret shared key. The Secure Hash Algorithm (SHA), the algorithm specified in the Secure Hash Standard (SHS, FIPS PUB 180-1: Secure Hash Standard, April 1995), was developed by NIST.

Here the HMAC-SHA-1 algorithms may be self executing applications or applets, or may merely be accessed by an application in response to a new key request, GetNextKey( ). With each request for a new key, a new 160-bit encryption key (KE) and the corresponding variable N are returned to the caller. Decryption smart card 350 is similar in all respects to smart card 300 except for not storing the persistent variables key card number (C) and reference number (n) in onboard memory 320. The decryption key generation process is also similar to the encryption key generation process. Smart card 350 maintains two values:

1. A Master Key (KM), which is set when the smart card is first initialized. Once initialized, KM cannot be changed.
2. A 32-bit CardGroup number (G), which describes a set of cards using the same Master Key. This value is set upon card creation and cannot be changed.

In the decryption key generation process, N represents the identity of a particular encryption key. Callers pass N to the smart card when requesting a particular decryption key. With each request for a decryption key, a 160-bit decryption Key (KD) is returned to the caller. An unlimited number of decryption key cards (corresponding to every encryption key card with the same KM) may be created. Each decryption key card can generate a decryption key that maps to any encryption key (generated by encryption key cards with the same KM).

Figure 4:
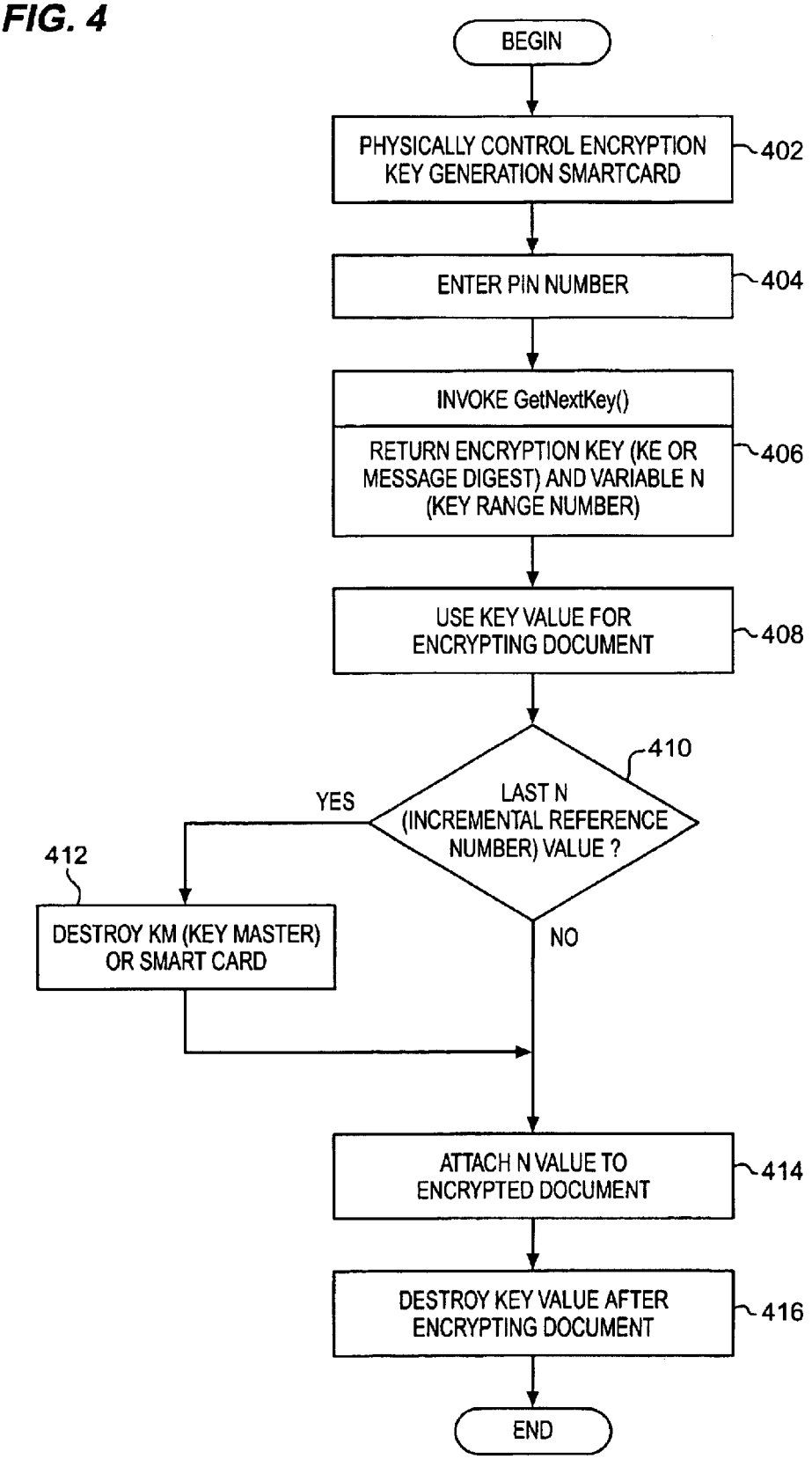
FIG. 4 is a flowchart depicting an encryption process for encrypting information in accordance with a preferred embodiment of the present invention.

FIG. 4 is a flowchart depicting an encryption process for encrypting information in accordance with a preferred embodiment of the present invention. The encryption process begins by having physical control over an encryption smart card (step 402).

For the purpose of the description of the encryption process, it is assumed that an encryption smart card issues only encryption keys while a decryption smart card issues only decryption keys, however, a single smart card has the capability for issuing both encryption and decryption keys. Similarly, a single smart card may issue either encryption or decryption keys in a plurality of CardGroups (G). In doing so, a user could employ a single smart card for encrypting and decrypting information for various individuals who are authorized to only one of the user's CardGroups. In either case, a smart card must be initialized with a master key (KM) for each CardGroup in which the user intends to encrypt/decrypt information.

Returning to FIG. 4, merely possessing the smart card is not enough. In accordance with a preferred embodiment of the present invention, the process of encrypting information relies on the smart card's inherent security systems. The smart card will only respond to a user who enters an authorized personal identification number (PIN). The smart card must verify the PIN (step 404). Upon receiving the authorized PIN, the user can invoke the GetNextKey( ) routine for generating an encryption key (KE) (step 406). GetNextKey( ) routine returns two values, a encryption key (a 160-bit value is used, but the bit length could be increased/decreased by modifying the key generation algorithm) and variable N (an 8-byte value is used, but could be any length). Variable N contains nothing that will compromise the key and may be freely stored with the encrypted data. The only attack comes if all of the following are stolen by the same person: variable N, the encrypted data, corresponding decryption smart card, and the PIN for the decryption smart card.

The encryption and decryption keys are generated by small applications or applets running on the smart cards themselves. Keys used for encryption are generated on the encryption smart card, while keys used for decryption are generated on the decryption smart card. Exactly the same key generation algorithm is used for the encryption key generation and decryption key generation processes, i.e., the HMAC-SHA-1 process (described in detail with respect to FIGS. 6A and 6B below). The difference is in how the routines are called, either the GetNextKey( ) routine described hereinbefore or the GetKey( ) routine discussed in detail below.

Returning to step 406, the encryption smart card returns the encryption key KE (message digest) and the variable N. By using the encryption key value generated from the GetNextKey( ) routine as the encryption key for the encryption algorithm, information (or documents) can then be encryptediusing any encryption algorithm. Of course, the encryption process is performed that converts unencrypted information to encrypted data Step 408).

The encryption smart card can issue a maximum number of keys equal to the maximum value of n (reference number). However, n is an incremental value that may be initialized at any value less than its maximum value. Therefore, the actual number of encryption keys generated by a particular card may vary from one key to the maximum value of n number of keys, depending on the initial value which n was set. Because the smart card might not have the capability to generate another encryption key, a check is then made to determine if n is at its last value (step 410). If the smart card returns the last value of n for that CardGroup, the smart card cannot generate another encryption key for that CardGroup. The smart card should then be destroyed (step 412). Clearly, the physical card need not be destroyed, but the master key value (KM) must be logically destroyed, at a minimum, to ensure that the spent card is not hacked for its KM.

Whether or not n is at its last value, the process continues by attaching the variable N (key range variable) to the encrypted information (step 414). Contrary to the prior art, the present invention allows for the publication of the key range variable (N) without fear of the encrypted information being compromised. This is possible because the variable N is not a decryption key, but only a key range variable. The key range variable is needed by the HMAC-SHA-1 algorithms for generating the exact decryption key that maps to the encryption key used for encrypting the information. Decryption keys can be generated using only the master key without using the variable N. However, those decryption keys would not decode the information back to its original unencrypted form without using the variable N for selecting the correct decryption key for the encrypted information.

The key is used for encrypting information. Once the information has been encrypted, the encryption key has no value and is only a security risk. The encryption key should then be destroyed (step 416). The process then ends.

Figure 5:
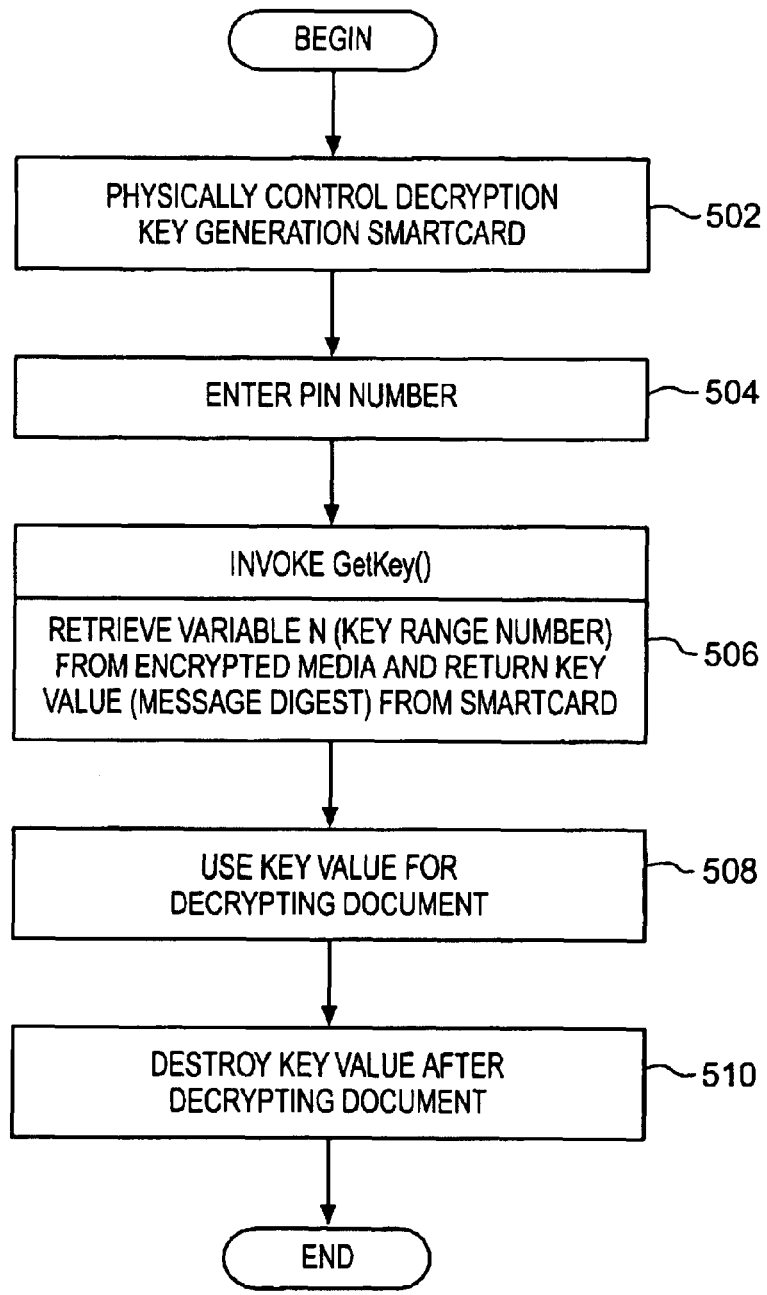
FIG. 5 is a flowchart depicting a decryption process for decrypting information in accordance with a preferred embodiment of the present invention.

FIG. 5 is a flowchart depicting a decryption process for decrypting information in accordance with a preferred embodiment of the present invention. The decryption process is a similar process as that described above with respect to FIG. 4. The decryption process begins with having physical control over the proper decryption smart card (step 502). Access to the decryption key generation capabilities of the smart card is granted when a user correctly enters a PIN, and it is verified by the smart card (step 504).

Upon receiving the authorized PIN, the user can invoke the GetKey( ) routine for generating a message digest used for a decryption key (KD) (step 506). As discussed above, the same key generation algorithm is used for the decryption key generation and encryption key generation processes. The difference between the two is how the key generation routines are called.

GetKey( ) has one input value and one output value. Variable N is retrieved from the encrypted data and input to the decryption smart card by the caller. In the present example, variable N is an 8-byte value, but could be any length as long as it is exactly the same value which was returned from the encryption smart card's GetNextKey( ) routine. Upon receipt of variable N, the variable is parsed and the CardGroup value is extracted from the concatenated variable N. That CardGroup value is checked against the CardGroup value stored on the smart card. This check ensures that the proper smart card can generate a decryption key that maps to the encryption key used to encrypt the information.

GetKey( ) outputs the decryption key (KD), which is a 160-bit value message digest in the present example, but (7 the bit length could be increased/decreased by modifying the key generation algorithm. The decryption key generated by the GetKey( ) routine is then used by a decryption algorithm corresponding to the encryption algorithm used to encrypt the information. The corresponding encryption algorithm is one which used an encryption key value generated from the GetNextKey( ) routine for the identical CardGroup and card number.

The information is decrypted using the decryption key KD (step 508). Afterwards the key is no longer needed and only poses a security risk, so it is deleted (step 510). This key can always be recreated following this same process.

Figure 6B:
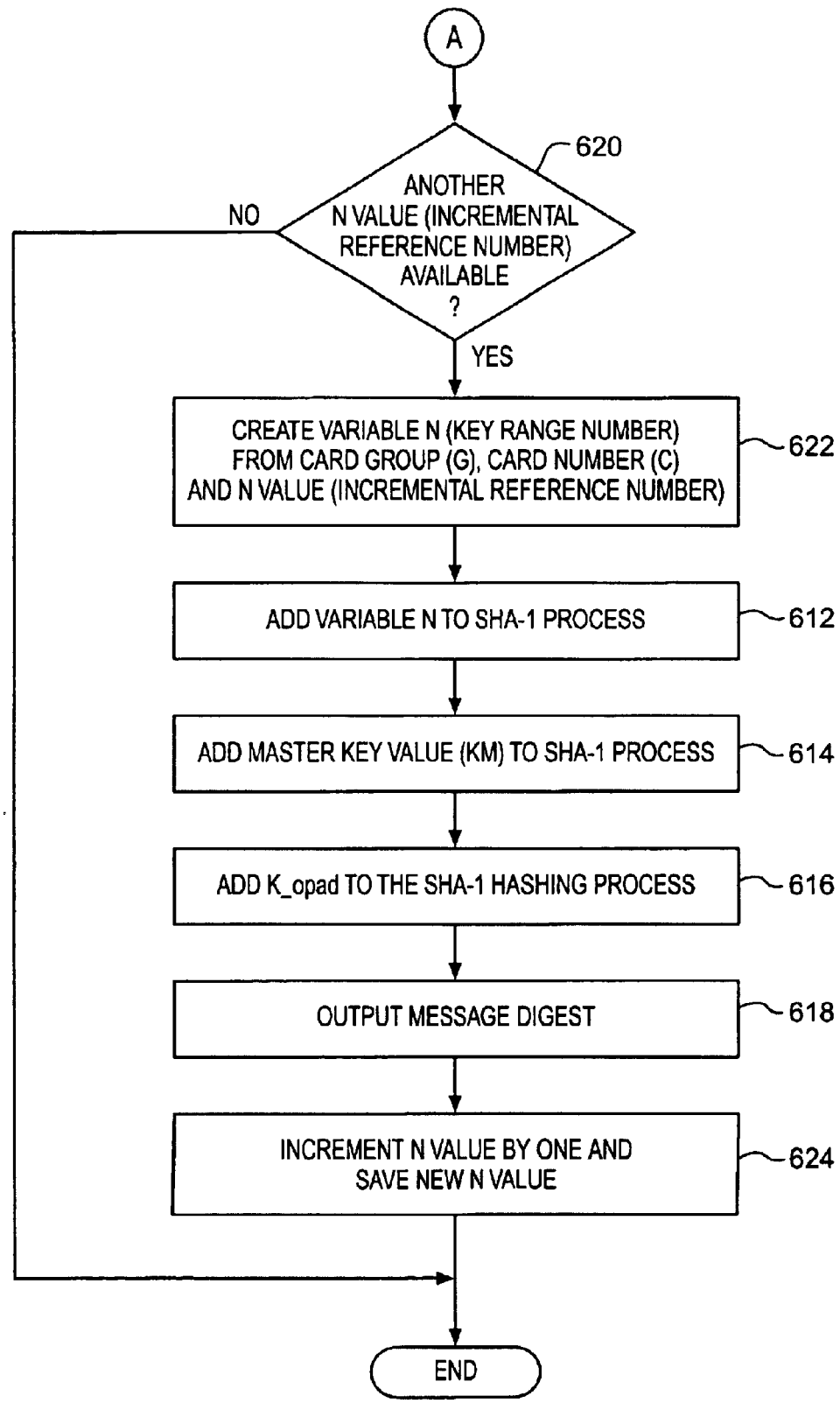

FIGS. 6A and 6B are flow charts depicting the key generation process in accordance with a preferred embodiment of the present invention. Keys are generated by the applications or applets running on the smart cards. A physical smart card supports both encryption and decryption key generation. The difference between decryption key generation and encryption key generation is in how the routines are called and not in the hashing algorithms. The same hashing algorithm is used for both. The HMAC-SHA-1 key generation algorithm is used for the encryption and decryption key generation in accordance with a preferred embodiment of the present invention, but other hashing algorithms could be substituted without departing from the scope of the present invention. The hash function-based MAC (HMAC) utilized by the present invention uses the master key from the smart card in conjunction with a hash function to produce a checksum mechanism for message authentication.

The key generation process begins by setting up the HMAC variables (step 602). Setup includes creating a variable called k_ipad, which is the same length as KM from the smart card and copy KM into it. Then creating a second variable called k_opad, which is also the same length as KM from the smart card and copying KM onto the k_opad variable. Next, 0x36 is Exclusively ORed (XOR) onto each byte in k_ipad while 0x5c is Exclusively ORed (XOR) onto each byte in k_opad (step 604).

Next, the SHA-1 hashing process is setup. Initially, the value of k_ipad is input to the SHA-1 hashing process (step 606). A check is then made to determine which key is being called for (step 608). If the caller has called the GetKey( ) routine, a decryption key is being requested by the caller. In that case the variable N is provided by the caller from the media containing the encrypted information (step 610).

Variable N is added to the SHA-1 process (step 612), followed by adding the master key value (KM) from the smart card to the SHA-1 process (step 614). Finally, the k_opad variable is added to the SHA-1 hashing process (step 616), and the SHA1 hashing process creates a 160-bit message digest or key (step 618). In this case, a decryption key has been generated and returned to the caller.

Returning to step 608, if the caller has called the GetNextKey( ) routine, an encryption key is being requested by the caller. The process then flows to step 620 shown on FIG. 6B. A test must be performed to determine if the smart card has usable n values for generating a unique encryption key (step 620). If no n values remain, the key generation process cannot continue and ends, the smart card should be destroyed, as it has no further use.

If, on the other hand, another n value is available, variable N is created (step 622). Variable N consists of concatenating G, C, and n in the form of 0xGGGGCCCnnnnn. After n has been used for creating variable N, the key generation process processed exactly as described above, including adding the variable N to the SHA-1 process (step 612), followed by adding the master key value (KM) from the smart card to the SHA-1 process (step 614). The process ends with the k_opad variable being added to the SHA-1 hashing process (step 616), which culminates in the creation of the 160-bit message digest or key (step 618). Finally, the value of n is incremented by one and the new n value is saved for creating another encryption key (step 624). In this case an encryption key is generated and returned to the caller.

The 160-bit message digest returned from the key generation algorithm is used during the encryption/decryption processes. Without the actual smart cards (which contain KM), variable N (the key reference number) does not convey any information about the keys. Therefore, variable N can be used in the clear to uniquely identify the key used to encrypt the target information. In accordance with a preferred embodiment, N is stored on the tape itself to identify the decryption key to be used when the information is read. This method will uniquely identify the keys to be used without the security risk of embedding the keys within the encrypted data.

The description of the present invention has been presented for purposes of illustration and description but is not intended to be exhaustive or limited to the invention in the form disclosed. Many modifications and variations will be apparent to those of ordinary skill in the art. For example, the tracking method described here is independent of the magnetic format and head structure and can generate a position error signal without encoding on the servo track. However, modulation and encoding can be added to increase function and reliability if desired.

The embodiment was chosen and described in order to best explain the principles of the invention and the practical application, and to enable others of ordinary skill in the art to understand the invention for various embodiments with various modifications as are suited to the particular use contemplated.

What is claimed is:

1. An encryption key management system comprising:
   a master key;
   a portable processor, wherein the portable processor uses the master key for generating an encryption key;
   a variable key range variable, wherein the portable processor further uses the variable key range variable for generating the encryption key, wherein the variable key range variable comprises at least one of a card number, a card group number and a reference number representing a number of keys; and an incrementor for increasing the value of the reference number in response to the encryption key being generated.

2. The encryption key management system recited in claim 1, wherein the variable key range variable is output with the encryption key.

3. The encryption key management system recited in claim 1, wherein the portable processor further comprises:

a hashing function for generating the encryption key.

4. The encryption key management system recited in claim 1, wherein the portable processor is a smart card.

5. The encryption key management system recited in claim 4, wherein the smart card is accessed through verification of a personal identification number.

6. The encryption key management system recited in claim 1, wherein the portable processor is a first portable processor and the system further comprises:

a second portable processor, wherein the portable processor uses the master key for generating a decryption key.

7. The encryption key management system recited in claim 6, wherein the second portable processor further uses the variable key range variable for generating the encryption key.

8. The encryption key management system recited in claim 7, wherein the variable key range variable is input to the second portable processor.

9. The encryption key management system recited in claim 7, wherein the second portable processor further comprises:

a hashing function for generating the decryption key using the master key.

10. The encryption key management system recited in claim 6, wherein the second portable processor is a smart card.

11. The encryption key management system recited in claim 10, wherein the smart card is accessed through verification of a personal identification number.

12. The encryption key management system recited in claim 7, wherein the second portable processor further comprises:

a hashing function for generating the decryption key.

13. An encryption key management system comprising:

a master key;

a portable processor, wherein the portable processor uses the master key for generating a decryption key;

a variable key range variable, wherein the portable processor further uses the variable key range variable for generating the decryption key, wherein the variable key range variable comprises at least one of a card number, a card group number, and a reference number representing a number of keys; and an incrementor for increasing the value of the reference number in response to the decryption key being generated.

14. The encryption key management system recited in claim 13, wherein the variable key range variable is output with the decryption key.

15. The encryption key management system recited in claim 13, wherein the portable processor further comprises:

a hashing function for generating the decryption key.

16. The encryption key management system recited in claim 13, wherein the portable processor is a smart card.

17. An encryption key management method comprising:

receiving a master key;

generating an encryption key using the master key, wherein the encryption key is generated by a portable processor;

outputting the encryption key;

creating a variable key range variable, wherein the portable processor uses the variable key range variable for generating the encryption key, wherein the variable key range variable comprises at least one of a card number, a card group number, and a reference number representing a number of keys; and incrementing an incrementor for increasing the value of the reference number in response to the encryption key being generated.

18. The method recited in claim 17 further comprises:

outputting the variable key range variable.

19. The method recited in claim 17, wherein generating the encryption key further comprises:

hashing the master key.

20. The method recited in claim 17, wherein the portable processor is a smart card.

21. The method recited in claim 20 further comprises:

verifying a personal identification number; and accessing functionality of the smart card.

22. The method recited in claim 17, wherein the portable processor is a first portable processor and the method further comprises:

generating a decryption key using the master key, wherein the decryption key is generated by a second portable processor; and outputting the decryption key.

23. The method recited in claim 22, prior to generating the encryption key further comprises:

receiving a variable key range variable, wherein the second portable processor uses the variable key range variable for generating the encryption key.

24. The method recited in claim 17, wherein the second portable processor is a smart card.

25. The method recited in claim 17, wherein a smart card is accessed through verification of a personal identification number.

26. An encryption key management method comprising:

receiving a master key; and generating a decryption key using the master key, wherein the decryption key is generated by a portable processor;

outputting the decryption key;

creating a variable key range variable, wherein the portable processor uses the variable key range variable for generating the decryption key, wherein the variable key range variable comprises at least one of a card number, a card group number, and a reference number representing a number of keys; and incrementing an incrementor for increasing the value of the reference number in response to the decryption key being generated.

27. The method recited in claim 26 further comprises:

outputting the variable key range variable.

28. The method recited in claim 26, wherein generating the decryption key further comprises:

hashing the master key.

29. The method recited in claim 26, wherein the portable processor is a smart card.

* * * * *